June 11, 1940.  G. J. THOMAS  2,203,754
HYDRAULIC OPERATOR
Filed Dec. 28, 1936  2 Sheets-Sheet 2

INVENTOR
GEORGE JOSEPH THOMAS
BY
*Whittemore Hulbert & Belknap*
ATTORNEYS

Patented June 11, 1940

2,203,754

UNITED STATES PATENT OFFICE 2,203,754

HYDRAULIC OPERATOR

George Joseph Thomas, Birmingham, Mich.

Application December 28, 1936, Serial No. 117,943

11 Claims. (Cl. 286—14)

The invention relates to hydraulic operators and refers more particularly to hydraulic devices for actuating brakes of motor vehicles.

The invention has for one of its objects to provide a simple construction of hydraulic operator having an effective seal between the cylinder and piston. The invention has for another object to so construct the cylinder, piston and packing ring therebetween that the latter upon assembly of the cylinder and piston is distorted and a part thereof is displaced in a direction toward the pressure zone within the cylinder so that the packing ring closely engages the cylinder and piston and pressure upon this packing ring by the operating fluid tends to cause even more effective sealing engagement of the packing ring with the cylinder and piston. The invention has for further objects to provide an improved mounting for the operator and to provide an improved adjustment between the piston and the member actuated thereby.

With these and other objects in view, the invention resides in the novel features of construction and combinations and arrangements of parts as more fully hereinafter set forth.

In the drawings:

Figure 1 is an elevation from the outboard side of a motor vehicle brake with the web of the brake drum omitted;

Figures 2 and 3 are cross sections on the lines 2—2 and 3—3, respectively, of Figure 1;

Figure 1:
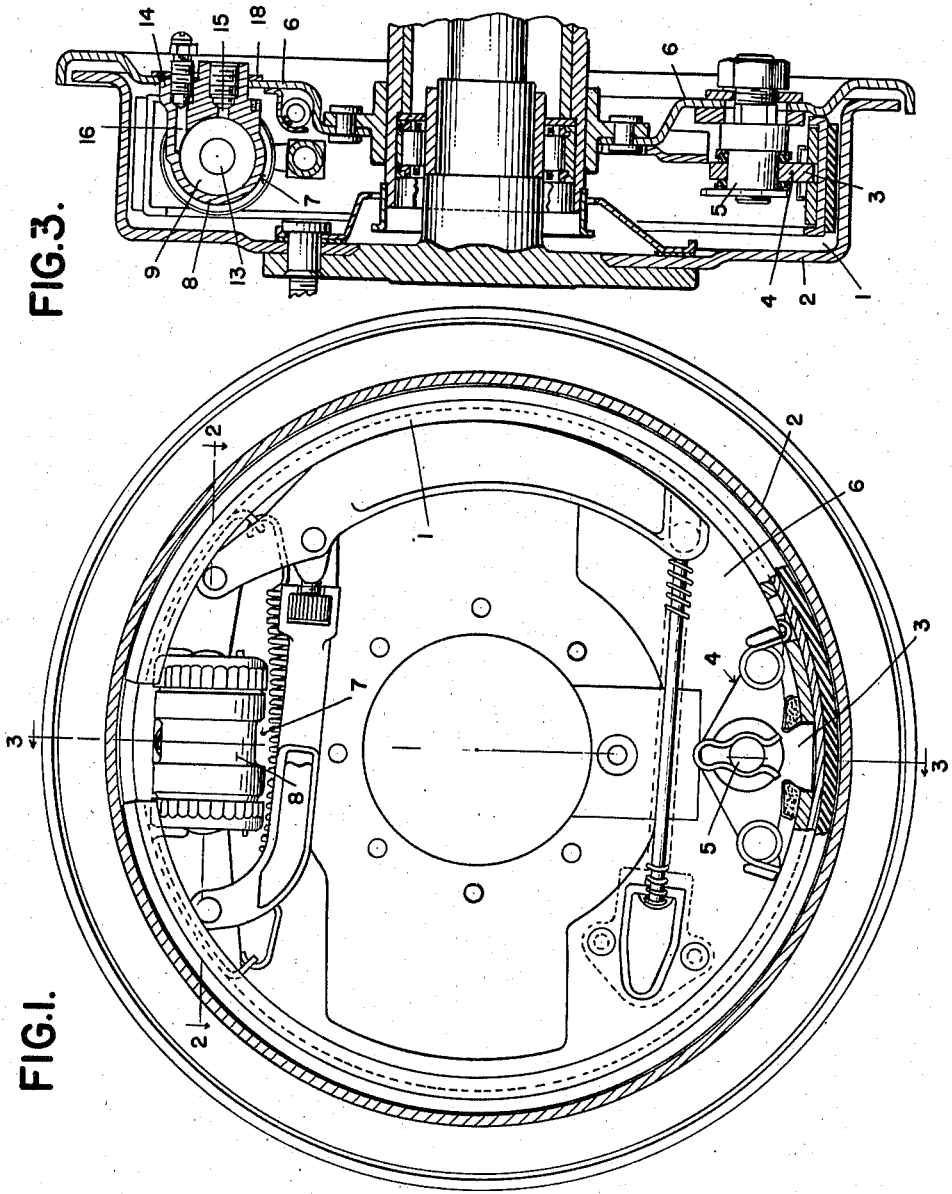
Figure 2:
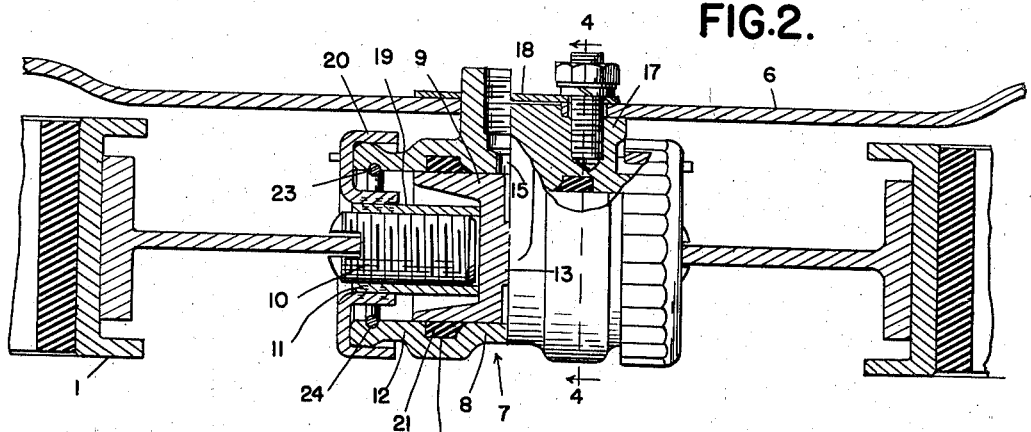
Figure 4:
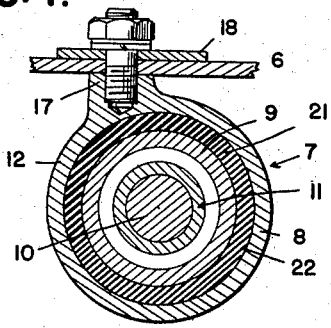
Figure 4 is a cross section on the line 4—4 of Figure 2.
Figure 5:
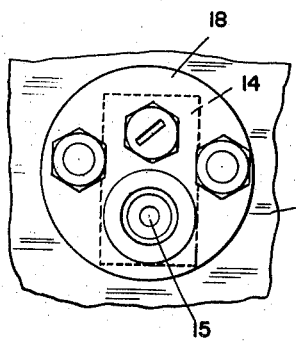
Figure 5 is an elevation from the inboard side illustrating the manner of mounting the actuator on the backing plate.

The hydraulic operator, as illustrated in the present instance, is adapted to actuate a motor vehicle brake. This brake comprises the brake friction device 1 which is located within the brake drum 2 and is adapted to be urged into frictional engagement with the brake flange of the drum. The brake friction device in the present instance is a brake band which at its middle engages the arm 3 of the lever 4, which latter is journaled upon the pin 5 secured to the backing plate 6.

For operating the brake friction device, I have provided the hydraulic actuator 7 diametrically opposite the pin 5 and located between the ends of the brake friction device 1. The actuator comprises the cylinder member 8, the pistons 9, the stems 10 and the members 11 for actuating the stems from the pistons, all of these members being preferably formed of metal. The pistons 9 are slidable in the axially aligned cylinders 12 formed in the cylinder member 8 and these pistons are preferably cup-shaped and have their cups facing in a direction away from each other. The heads of the pistons are preferably provided with the central projections 13 which are adapted in the normal position of the pistons to extend closely adjacent to and preferably abut each other centrally of the piston member 8. The cylinder member is provided with the lateral polygonal projection 14 which is adapted to extend through a correspondingly-shaped opening in the backing plate 6. This projection 14 is provided with the passage 15 for the flow of the braking fluid to and from the pressure zone of the cylinder member between the pistons. The projection 14 is also provided with the bleed outlet 16 communicating with the uppermost part of the pressure zone of the cylinder member. For securing the actuator to the backing plate, I have provided suitable threaded members extending through the backing plate at the sides of the polygonal projection 14 and into the lugs 17 formed upon the cylinder member and abutting the backing plate. A circular plate 18 is preferably provided encircling the projection 14 and abutting against the outer side of the backing plate.

The outer ends of the cylinders 12 are open and the members 11 extend within these open ends. Each of these members has the concentric cylindrical inner and outer parts 19 and 20 respectively, the inner part having its inner end abutting the head of the associated piston 9 and the outer part being sleeved over and slidably engaging the outer end portion of the associated cylinder 12. The inner part 19 also threadedly engages the associated stem 10, the outer end of which, as shown, is provided with a diametrical slot for engaging the adjacent end of the brake friction device 1. The radially extending annular part connecting the inner and outer parts abuts the end of the associated cylinder and is adapted to limit the inward movement of the associated stem. It will thus be seen that the members 11 serve as seals for the open ends of the cylinders and furthermore serve to adjust the stems with respect to the pistons, this being accomplished by rotation of the members 11, the outer parts 20 being preferably serrated to facilitate this operation.

To effectively seal the actuator, I have provided between each of the pistons 9 and the associated cylinders 12 the packing ring 21. This packing ring is formed of a material which is relatively non-compressible and which may be distorted so that a portion thereof may be displaced. In the present instance, the material is rubber, which may be either natural or synthetic. Each of the cylinders 12 is provided with the annular groove 22 which opens toward the associated piston. This annular groove is formed in two portions, one of which may be said to be an annular rectangular portion and the other of which may be said to be an annular triangular portion. The former forms the major portion of the groove and the latter the minor portion of the groove. The latter connects into the open portion of the former on the side toward the pressure zone of the cylinder member 8. The bottom of the triangular portion is inclined toward the bottom of the rectangular portion. The packing ring normally has a shape substantially like that of the rectangular portion and is designed so that its axial dimension is the same as the axial dimension of the rectangular portion, but its radial extent is greater than the radial extent of the rectangular portion. The radial extent of the packing ring is determined by the outer diameter, which is the same as the outer diameter of the rectangular portion, and by the inner diameter, which is less than the inner diameter of the rectangular portion. As a result, it will be seen that the mass of the packing ring is greater than the volumetric capacity of the rectangular portion so that normally the packing ring extends radially inwardly beyond the wall of the cylinder. As a result, upon assembly of the piston with the cylinder by inward movement of the former, the packing ring is distorted and a portion thereof is displaced into the triangular portion of the groove, this portion forming a lip facing toward the pressure zone of the cylinder. With this construction, the packing ring closely engages both the cylinder and piston and by reason of its lip construction any pressure upon the packing ring exerted by the braking fluid serves to bring the packing ring more closely into engagement with the cylinder and piston. This construction has been found by exhaustive test to provide a very effective seal against leakage of the braking fluid past the piston.

For the purpose of limiting outward movement of the pistons when the actuator is in normal or inoperative position and the brake friction device is in retracted position, there are the transversely split resilient rings 23 which have snap engagement in the annular grooves 24 formed in the cylinders 12 near their outer ends, these rings being engageable with the outer ends of the pistons.

Figure 6:
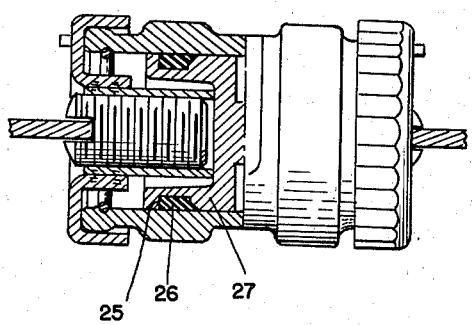
Figures 6 and 7 are views similar to Figure 2 illustrating modifications.

The modification illustrated in Figure 6 is very similar to that illustrated in Figures 1 to 5 inclusive, with the exception that the annular grooves 25 for receiving the packing rings 26 are located in the pistons 27 instead of in the cylinders. These grooves open toward the cylinder walls and they and also the packing rings are formed in the same manner as those described with reference to Figures 1 to 5 inclusive. Furthermore, the packing rings are assembled and function in the same manner.

Figure 7:
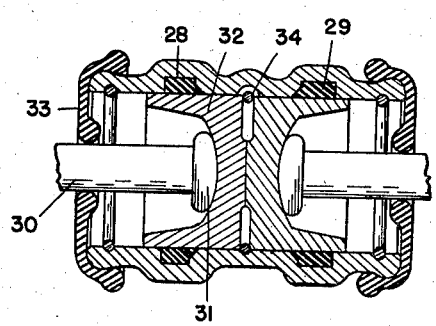

Figure 7 illustrates another modification having the same arrangement of grooves 28 and packing rings 29, as described with reference to Figures 1 to 5 inclusive. However, in this construction the stems 30 for engaging the ends of the brake friction device are provided at their inner ends with the enlargements 31 which have rounded surfaces engaging corresponding surfaces in the heads of the pistons 32. For sealing the open ends of the cylinders, there are the resilient seals 33 which are preferably formed of rubber and which have beaded peripheries firmly secured over the outer ends of the cylinders and central openings through which the stems 30 pass, these openings being bordered by beaded portions slidably engaging the stems. This construction is also provided with the stop 34 for engaging the heads of the pistons 32 and centering the pistons in the cylinder member when the former are in their normal or inoperative positions. The stop is in the nature of a split resilient ring seated in an annular groove in the cylinder member.

What I claim as my invention is:

1. A hydraulic operator, comprising cylinder and piston members, one of said members having an annular groove opening toward the other and provided with a main portion and a beveled portion at an edge thereof, and a packing ring normally occupying only said main groove portion and having a shape substantially corresponding thereto, said ring also having a mass greater than the volumetric capacity of said main groove portion, said packing ring being subjected to distortion when said cylinder and piston members are assembled thereby to displace a portion of the packing ring into said beveled groove portion so as to occupy the same.

2. A hydraulic operator, comprising cylinder and piston members, one of said members having an annular groove opening toward the other and provided with a main portion and laterally relieved portion at an edge thereof, and a packing ring normally having a shape substantially like that of said main groove portion and also having a radial extent greater than that of said main groove portion, said packing ring normally filling only said main groove portion while extending radially therebeyond, said packing ring being subjected to distortion when said cylinder and piston members are assembled thereby to displace a portion of the packing ring into said relieved groove portion.

3. A hydraulic operator, comprising cylinder and piston members, one of said members having an annular groove rectangular in cross section opening toward the other and provided with a main portion and a beveled portion at an edge thereof, and a packing ring normally occupying only said main groove portion and having a shape rectangular in cross section substantially corresponding thereto, said ring also having a mass greater than the volumetric capacity of said main groove portion, said packing ring being subjected to distortion when said cylinder and piston members are assembled thereby to displace a portion of the packing ring into said beveled groove portion so as to occupy the same.

4. A hydraulic operator, comprising cylinder and piston members, said piston member having an annular groove opening toward said cylinder member and provided with a main portion and a laterally relieved portion at an edge thereof, and a packing ring normally having a shape substantially like that of said main groove portion and also having a radial extent greater than that of said main groove portion, said packing ring normally filling only said main groove portion while extending radially therebeyond, said packing ring being subjected to distortion when said cylinder and piston members are assembled thereby to displace a portion of the packing ring into said relieved groove portion.

5. A hydraulic operator, comprising a cylinder member, a piston member slidable within said cylinder member, one of said members having an annular groove opening toward the other and provided with axially adjacent major and minor annular portions with the latter having a bottom inclined toward the bottom of the former, and a packing ring having a mass greater than the volumetric capacity of said major portion, said packing ring normally in unstressed condition occupying substantially only said major portion but adapted to occupy both said major and minor portions when said cylinder and piston members are assembled.

6. A hydraulic brake operator, comprising a cylinder member, a piston member slidable within said cylinder member, one of said members having an annular groove opening toward the other and provided with an annular portion having an inclined bottom, and a packing ring normally rectangular in cross section when unstressed located in and normally having a radial extent greater than that of said groove, said packing ring when placed in compression between said cylinder and piston members having an annular lip extending within said inclined bottom portion and said packing ring closely engaging said cylinder and piston members.

7. A hydraulic operator, comprising cylinder and piston members, one of said members having an annular groove opening toward the other and provided with an annular rectangular portion and an axially adjacent annular triangular portion with the bottom of the latter inclined toward the bottom of the former, and a packing ring normally rectangular in cross-section when unstressed having a mass greater than the volumetric capacity of said rectangular groove portion, said packing ring being subjected to distortion when said cylinder and piston members are assembled and having portions extending within said rectangular triangular groove portions.

8. A hydraulic actuator, comprising a cylinder member, a piston member slidable within said cylinder member, one of said members having an annular groove opening toward the other and provided with a major annular portion and a minor annular portion extending axially from the open part of said major portion, and a packing ring located in said groove and normally occupying substantially only said major portion when unstressed, said ring having a mass greater than the volumetric capacity of said major portion whereby assembly of said cylinder and piston members causes distortion of said packing ring and displacement of a portion thereof into said minor portion.

9. A hydraulic brake operator, comprising cylinder and piston members, said cylinder member having a pressure zone at one end of said piston member, one of said members having an annular groove opening toward the other and provided with a major annular portion and a minor annular portion communicating axially with said major portion and extending therefrom toward the pressure zone, and a packing ring normally occupying substantially only said major portion when unstressed, said ring having a mass greater than the volumetric capacity of said major portion, said packing ring being subjected to distortion when said cylinder and piston members are assembled and having portions extending within said major and minor groove portions.

10. A hydraulic brake operator, comprising a cylinder, a reciprocable piston fitting within said cylinder and adapted to be subjected to fluid pressure in a pressure zone at the inner end of the piston, said cylinder having an annular groove disposed intermediate the ends of the piston, and a resilient rubber packing ring confined within said groove, the inner edge of the groove nearer said pressure zone being relieved to provide an annular portion normally substantially unoccupied by said ring, said ring normally when unstressed extending radially inwardly beyond the inner edges of said groove but being placed in compression when the piston and cylinder are assembled thereby to displace a portion of the packing ring in the direction of said pressure zone to occupy the relieved portion of the groove.

11. A hydraulic brake operator, comprising a cylinder, a reciprocable piston fitting within said cylinder and adapted to be subjected to fluid pressure in a pressure zone at the inner end of the piston, said cylinder having an annular groove disposed intermediate the ends of the piston at a point nearer the outer end of the piston than the inner end when the piston is at the inner end of its stroke, and a resilient rubber packing ring confined within said groove, the inner edge of the groove nearer said pressure zone being relieved to provide an annular portion normally substantially unoccupied by said ring, said ring normally when unstressed extending radially inwardly beyond the inner edges of said groove but being placed in compression when the piston and cylinder are assembled thereby to displace a portion of the packing ring in the direction of said pressure zone to occupy the relieved portion of the groove.

GEORGE JOSEPH THOMAS.